United States Patent
Clark et al.

(10) Patent No.: US 9,807,732 B1
(45) Date of Patent: Oct. 31, 2017

(54) TECHNIQUES FOR TUNING CALLS WITH USER INPUT

(71) Applicant: Facebook, Inc., Menlo Park, CA (US)

(72) Inventors: Jason Clark, Woodinville, WA (US); Jiawei Ou, Woodinville, WA (US); Stephane Taine, Issaquah, WA (US)

(73) Assignee: FACEBOOK, INC., Menlo Park, CA (US)

(*) Notice: Subject to any disclaimer, the term of this patent is extended or adjusted under 35 U.S.C. 154(b) by 2 days.

(21) Appl. No.: 15/233,857

(22) Filed: Aug. 10, 2016

(51) Int. Cl.
*H04W 24/08* (2009.01)
*H04W 72/02* (2009.01)
*H04W 4/12* (2009.01)

(52) U.S. Cl.
CPC ............ *H04W 72/02* (2013.01); *H04W 4/12* (2013.01); *H04W 24/08* (2013.01)

(58) Field of Classification Search
CPC .................................. H04W 4/12; H04W 24/08
See application file for complete search history.

(56) References Cited

U.S. PATENT DOCUMENTS

| | | | |
|---|---|---|---|
| 2006/0188078 A1* | 8/2006 | Jordan | H04M 3/523 379/207.01 |
| 2010/0046732 A1* | 2/2010 | James | H04M 3/42178 379/211.01 |
| 2011/0177797 A1* | 7/2011 | Vendrow | H04M 3/4234 455/414.1 |
| 2014/0278413 A1* | 9/2014 | Pitschel | G10L 15/063 704/243 |
| 2015/0003595 A1* | 1/2015 | Yaghi | G06Q 10/063 379/85 |
| 2016/0057676 A1* | 2/2016 | White | H04W 36/0022 370/333 |

* cited by examiner

*Primary Examiner* — Asghar Bilgrami

(57) ABSTRACT

Techniques for using user input to tune calls include receiving communication data from a first client device, at a server, directed to a second client device during a call between the first client device and the second client device; forwarding the communication data to the second device; receiving from one of the first client device or the second client device, first user input data; using the first user input data as an input to a call-tuning model; and modifying a call parameter of the call according to output from the call-tuning model in response to the first user input. Other embodiments are described and claimed.

20 Claims, 14 Drawing Sheets

Communication System 100

TECHNIQUES FOR TUNING CALLS WITH USER INPUT

BACKGROUND

Interpersonal communication has progressed from the written word and voice communication to instantaneous communications that may include text, images, video, and sound. Interpersonal communication can take place between two or among many participants. During a communication session, e.g. during a phone call or video call, the parameters of the call may be modified according to various measurable call characteristics, such as latency, bandwidth, bit rates, or codecs used. However, the user perception of the call quality may differ from the objectively measurable quality of the call. It is with respect to these and other considerations that the present improvements are needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for using user input to tune calls. Some embodiments are particularly directed to techniques for using subjective user input received during a call as input to a call-tuning model, and using output from the call-tuning model to modify one or more call parameters during the call. In one embodiment, for example, a method may include receiving communication data from a first client device, at a server, directed to a second client device during a call between the first client device and the second client device; forwarding the communication data to the second device; receiving from one of the first client device or the second client device, first user input data; using the first user input data as an input to a call-tuning model; and modifying a call parameter of the call according to output from the call-tuning model in response to the first user input. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
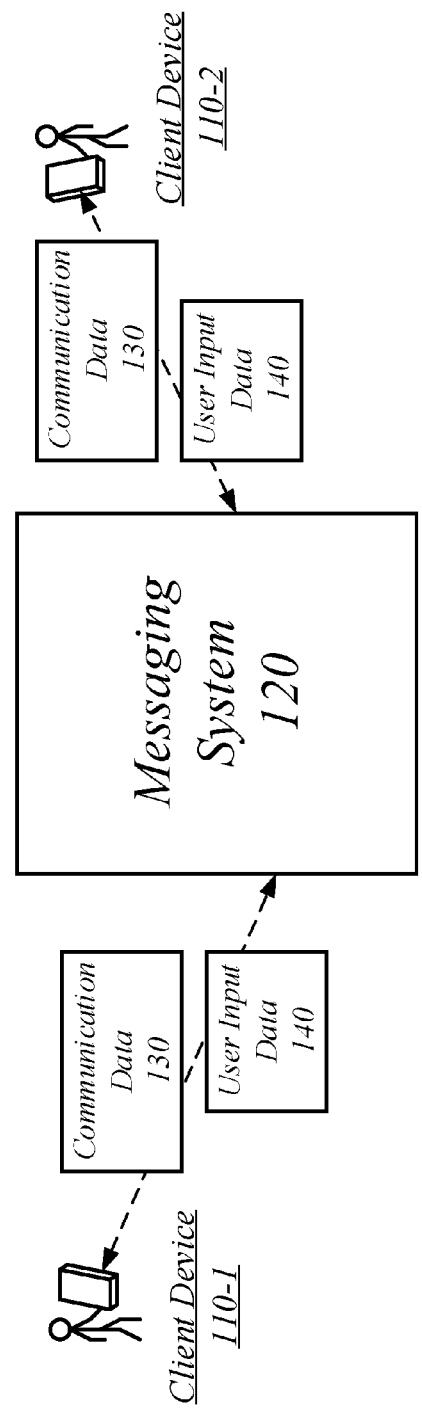
FIG. 1 illustrates an embodiment of an execution system for a communication system.

Various embodiments are generally directed to techniques for using user input to tune calls. Some embodiments are particularly directed to techniques for using subjective user input received during a call as input to a call-tuning model, and using output from the call-tuning model to modify one or more call parameters during the call.

During conventional communication sessions, e.g. during telephone calls, voice over Internet protocol (VOIP) calls, or video calls, the system that enables the communication session may monitor call parameters such as network conditions, packet loss, signal to noise ratios, or other measurable objective factors that can affect the quality of the communication session. Some of these systems may be able to change one or more call parameters during the call to correct for degraded call quality.

Conventionally, however, there is no way for a user participating in a communication session to provide input or feedback during the call in a way that can improve call quality, either during the call or for use in future calls. Embodiments described herein may receive user input data during a call between two or more devices and may use the user input data as input to a call-tuning model. The user input data may cause the call-tuning model to output a modification to one or more call parameters during the call. In addition, the user input data may be used to train and update the call-tuning model for use in future calls.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to an apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct a more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a communication system 100 that uses received user input to tune calls. In one embodiment, the system 100 may comprise a computer-implemented system 100 having a client device 110-1 operated by a first participant, a client device 110-2 operated by a second participant, and a messaging system 120, each comprising one or more components. Although the system 100 shown in FIG. 1 has a limited number of elements in a certain topology, it may be appreciated that the system 100 may include more or fewer elements in alternate topologies as desired for a given implementation.

As shown in FIG. 1, the operators of the client devices 110 are conducting a communication session, also referred to as a call, by exchanging communication data 130 via the messaging system 120. The communication data may comprise, for example, and without limitation, video data, audio data, file data, or text data.

During the call, the operators of the client devices 110 may use their respective client devices to create user input data 140, which may be sent from the client device 110 to the messaging system 120, and to the other client device(s) on the call. The user input data 140 may comprise, for example, one or more of: an audio sticker, a mask, a reaction, an emoji, a doodle, or a mood.

In addition to being sent to the other client device(s) participating in the call, the user input data 140 may be used to tune one or more call parameters that affect the transmission of the communication data 130. The user input data 140 may be mapped to portions of a call-tuning model, such that the receipt of a particular form or item of user input data 140 may cause a specific change to a call parameter.

An audio sticker may comprise an audio file that is paired with a particular image file. The audio sticker may be sent from one client device 110 to another client device. When received, the audio sticker may appear on the receiving client device as the image, and when selected by the operator of the receiving client device, the associated audio file may be output through an audio output component on the client device. In some embodiments, an audio sticker may be mapped to a specific output within a call-tuning model. For example, an audio sticker may have an audio file that speaks the text "I'm in a tunnel" when played. The audio sticker, when received as user input data, may cause the call-tuning model to output adjustments to call parameters that maintain the call connection while the sending client device is a tunnel, and may additionally prevent a call management component from attempting to achieve better call quality than is possible in a tunnel situation.

A mask may comprise a graphical effect applied to a live video image. A mask may temporarily alter the appearance of the video image, for example, by applying different colors, lighting, accessories such as glasses, hats, hairstyles, animations, or any other visual effect. A mask may appear to overlay the video image displayed on the mobile device receiving the video image. In some embodiments, a mask may be mapped to a specific output within a call-tuning model. For example, when a mask depicting flames around a person's head is applied, or "thrown", that mask may be mapped to an anger mood, which may indicate that the volume of the speaker's voice is too loud and appears angry. The call-tuning model may, accordingly, adjust the volume of the sound received with the video image. In other embodiments, the mask may not be initially mapped to a specific output in the call-tuning model, but may come to be mapped to an output over time as the call-tuning model is updated through machine learning.

A reaction may include a static image, similar to an emoji, that is mapped to a specific mood, for example, but not limited to: like, love, amused, surprised, angry, or sad. A reaction may be selected by a user during the call, and may be linked or associated with a time stamp indicating when the reaction was selected during the call. In some embodiments, a reaction may be mapped to a specific output within a call-tuning model. For example, the mood associated with the reaction may indicate a positive or negative call quality indicator.

An emoji may be a static facial expression represented by a series of ASCII characters, for example a smiling face represented by the colon and an open parenthesis—:), or may be an image file that represents a static facial expression. Emojis may also include non-facial images, e.g. hearts, flowers, or any other graphical image. As with reactions, some emojis may be mapped to a mood or otherwise mapped to a specific output within a call-tuning model A doodle may be a user-generated graphic. For example, some messaging application clients may provide an interface that receives input from the user, e.g. a finger trace on a touch-sensitive surface, or an input device cursor movement, that creates a drawing. In some embodiments, the doodle may be applied similarly to a mask, e.g. as an overlay to a video image. In some embodiments, a doodle may be used to train the call-tuning model to generate a specific output. For example, doodles that are applied around a person's mouth might indicate that a change to the sound quality may be applicable.

These, and other, user input data 140 may be used during the call both to communicate with the other participant(s) on the call and as inputs to the call-tuning model.

In addition, the system 100 may include a messaging system 120. The messaging system 120 may assist in setting up a call between two or more participants such as client device 110-1 and 110-2, and may coordinate the exchange of communication data 130 and user input data 140 among the participants. The messaging system 120 may also adjust one or more call parameters to maintain or improve call quality based, at least in part, on the user input data 140 and on objective call inputs. The messaging system 120 may be embodied in a single device or with multiple devices, and is explained in further detail below.

A client device 110 may be any electronic device capable of, at least, receiving audio data and/or recording audio data from a microphone, outputting audio data to the sender, and communicating with other devices to exchange data and instructions over a network. The client device 110 may communicate with other devices using wireless transmissions to exchange network traffic. Exchanging network traffic, such as may be included in the exchange of communication data 130 and/or user input data 140, may comprise transmitting and receiving network traffic via a network interface controller (NIC). A NIC comprises a hardware component connecting a computer device, such as client device 110, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API).

The client device 110 may perform various operations using network data accessed over a network. The client device 110 may access a cellular system using cellular signals (not shown). The client device 110 may access one or more Wi-Fi access points using Wi-Fi signals (not shown).

Figure 2:
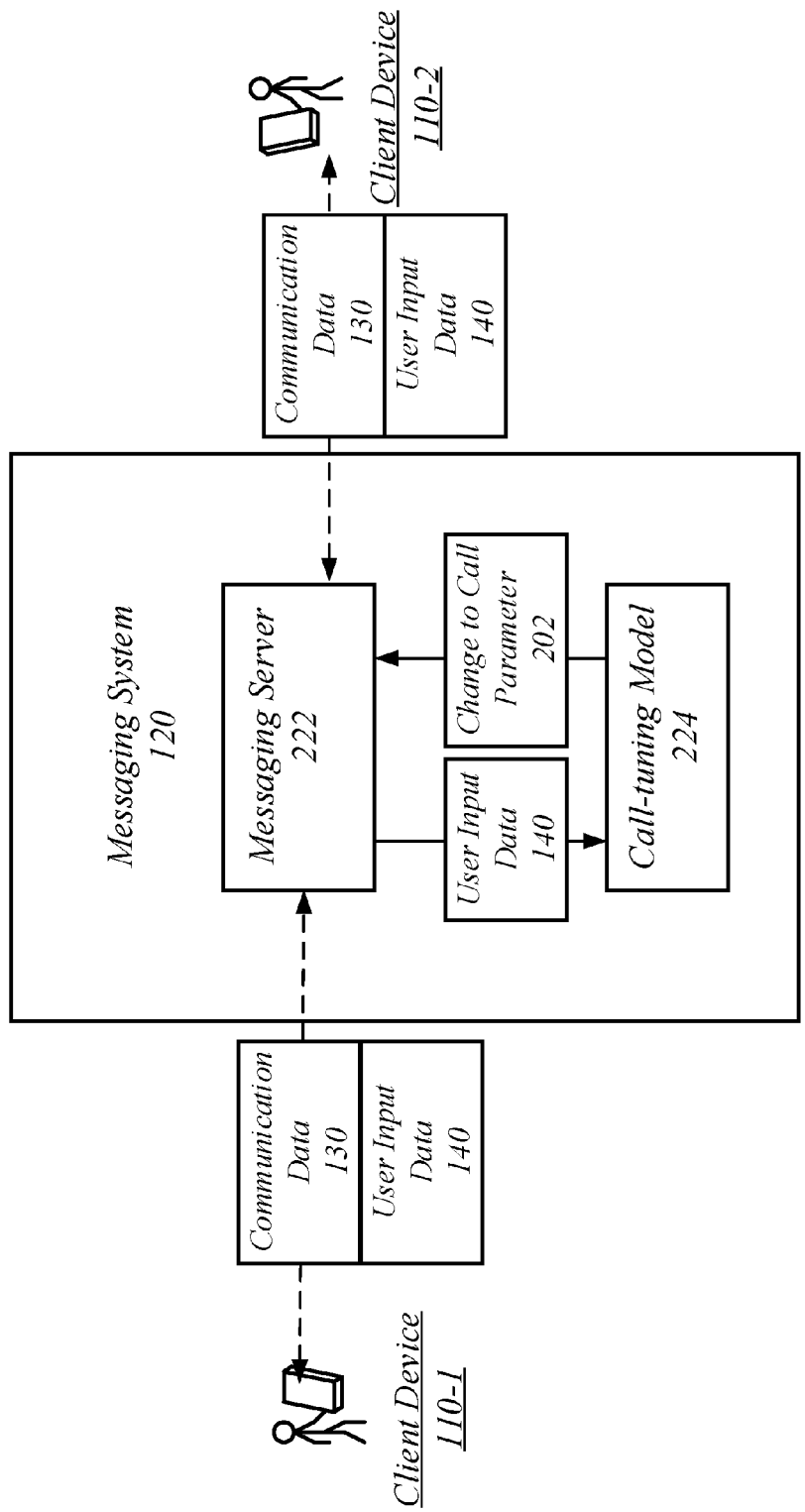
FIG. 2 illustrates an embodiment of a messaging system for the system of FIG. 1.

FIG. 2 illustrates a block diagram of the messaging system 120 for the system 100. Although the system 100 shown in FIG. 2 has a limited number of elements in a certain topology, it may be appreciated that the system 100 may include more or fewer elements in alternate topologies as desired for a given implementation. As shown in FIG. 2, the messaging system 120 may include, for example, a messaging server 222 and a call-tuning model 224.

The messaging server 222 may receive communication data 130 and user input data 140 from any of the participants on the call. The messaging server 222 may forward the communication data 130 and the user input data 140 to the other participant(s) on the call, and may also provide the user input data 140 as input to the call-tuning model 224.

The call-tuning model 224 may include a set of rules that specify, for one or more inputs, a specific call parameter to change and what change to make. Thus, for a particular set of inputs, e.g. information from the user input data along with information about objective call conditions, the call-tuning model 224 may output a change to a call parameter 202. The messaging server 222 may then modify the call parameter as indicated in the output 202. The operations of the messaging server 222 are described in greater detail below.

Figure 3:
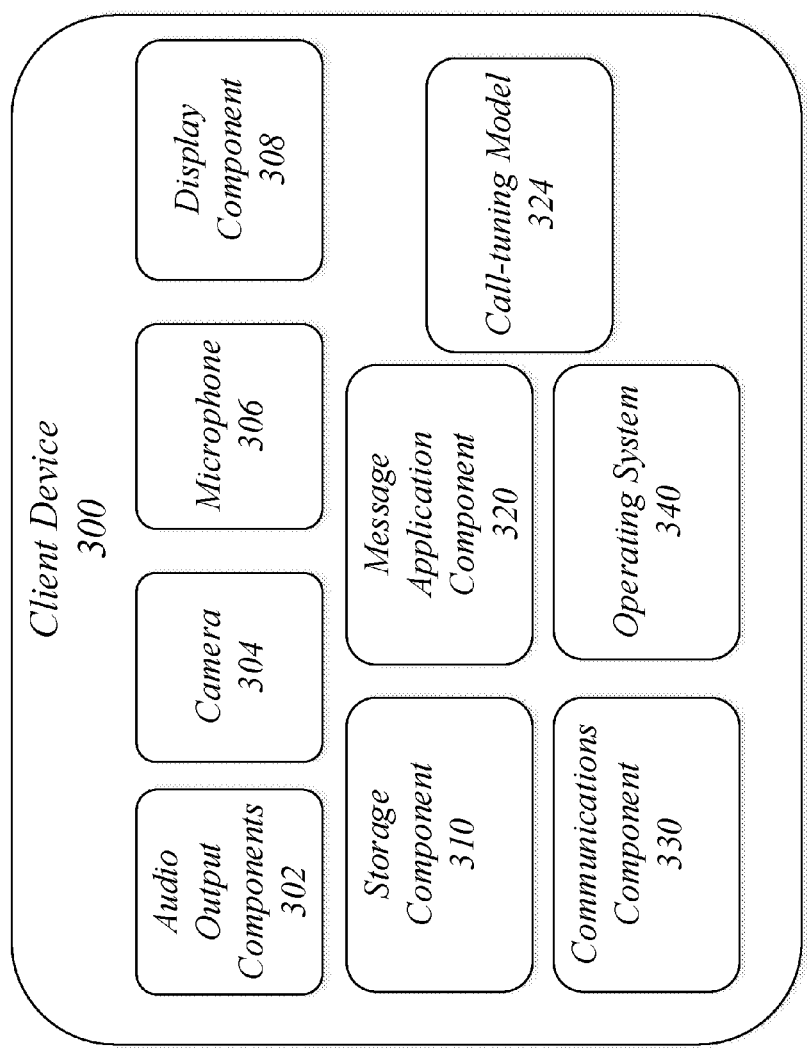
FIG. 3 illustrates an embodiment of a client device for the system of FIG. 1.

FIG. 3 illustrates a block diagram of a client device 300 for the system 100. The client device 300 may be an embodiment of client device 110. The client device 300 may include various hardware components and software components. The hardware components may include various audio output components 302, a camera 304, a microphone 306, and a display component 308. Other hardware components may also be included, such as various other input components, e.g. a keyboard or keypad, as well as a global positioning system (GPS) component, an altimeter, and so forth.

The audio output components 302 may include any components operative to output sound waves, such as an earpiece speaker, a loudspeaker, and/or an audio-out connection. The audio output components 302 may include hardware and/or software that converts between analog and digital sound data.

The camera 304 may be a camera integrated into the client device 300 that can take digital photographs through a lens and store the digital photos. The camera 304 may also operate as a video camera that can record video data for storage and/or transmission during a video call.

The microphone 306 may be any device capable of receiving sound waves, e.g. spoken by a human operator, and converting the received sound waves into electrical signals and/or data that can be stored and transmitted to other devices. The microphone 306 may be integrated into the client device 300, or may be an external microphone coupled to the client device 300 wirelessly or through an external wired connection. The microphone 306 may be for example, a component of a head-set, earpiece, or other hands-free communication device that communicates with the client device 300 via a short-range signal technology such as BLUETOOTH® technology. The embodiments are not limited to this example.

The display component 308 may include any interface components capable of presenting visual information to the operator of the client device 300, such as, but not limited to, a screen for visual output including video data received during a call that includes video data or other visual forms of communication.

The client device 300 may further include a storage component 310 in the form of one or more computer-readable storage media capable of storing data and instructions for the functions of software, such as a message application component 320, an operating system 340, and a call-tuning model 324. As used herein, "computer-readable storage medium" is not intended to include carrier waves, or propagating electromagnetic or optical signals.

The client device 300 may include various software components, such as a message application component 320. The message application component 320 may comprise instructions that when executed by a processing circuit (not shown) cause the client device 300 to perform the operations of the message application component 320 as will be described herein. Generally, the message application component 320 may be provided on the client device 300 at the time of purchase, or may installed by the sender, and may enable the creation, communication, and playback of communication in a variety of formats, including, but not limited to, real-time audio, audio messages, text, real-time video, and video recordings.

The message application component 320 may be software and/or a combination of software and hardware operating on any electronic device capable of exchanging data, such as communication data 130 and user input data 140.

The message application component 320 may allow a participant to communicate with others, e.g. with other participants, by sending and receiving communication data 130, in a manner analogous to a telephone call. The message application component 320 may be, for example, and without limitation, an electronic mail application, a short-message-service (SMS) message application, a multimediamessage-service (MMS) message application, a group communication application, a telephone voicemail system application, a video-communication application, and so forth. The message application component 320 may be a message application that provides multiple modes of communication, including but not limited to, alphanumeric text, real-time voice calls, real-time video calls, multimedia messages, data representing special effects, and so forth. The message application component 320 may be a social network application that allows its members to communicate with messages. The message application component 320 may accept an address for a recipient, such as an e-mail address, a chat handle, a telephone number, a user name within a social network service, and so forth.

The message application component 320 may be operative to apply special effects or after effects to communication data, e.g. from user input data. For example, if one client device sends a mask during a video chat, the message application component 320 may be able to display the mask as part of the video data.

The client device 300 may include a local copy of a call-tuning model 324. The call-tuning model 324 may be a copy of the call-tuning model 224. In some embodiments, the message application component 320 and/or the communications component 330 may receive user input data 140 from any of the participants on the call, and may provide the user input data 140 to the call-tuning model 224 to receive an output that indicates a change to make to a call parameter. This may occur, for example, if the call participants are in a peer-to-peer mode and are not using the messaging system 120 to exchange communication data 130 or user input data 140. In these embodiments, the received user input data 140 may be stored for use a training data for the call-tuning model 124 at a time when the client device 300 is in communication with the messaging server 222.

The client device 300 may include a communications component 330. The communications component 330 may include one or more hardware and/or software components that allow the transmission and receiving of signals by the client device 300. The communications component 330 may include the hardware and/or instructions to communicate on a data network, such as over a long-term evolution (LTE) network. The communications component 330 may include the hardware and/or instructions to communicate in a shorter-range network, such as by Wi-Fi or by BLUETOOTH®. The communications component 330 may include the hardware and/or instructions to communicate on a cellular telephone network, such as cellular system 130. The communications component 330 may support peer-to-peer network connections, and may be able to detect when other client devices are available for a peer-to-peer connection.

Figure 4:
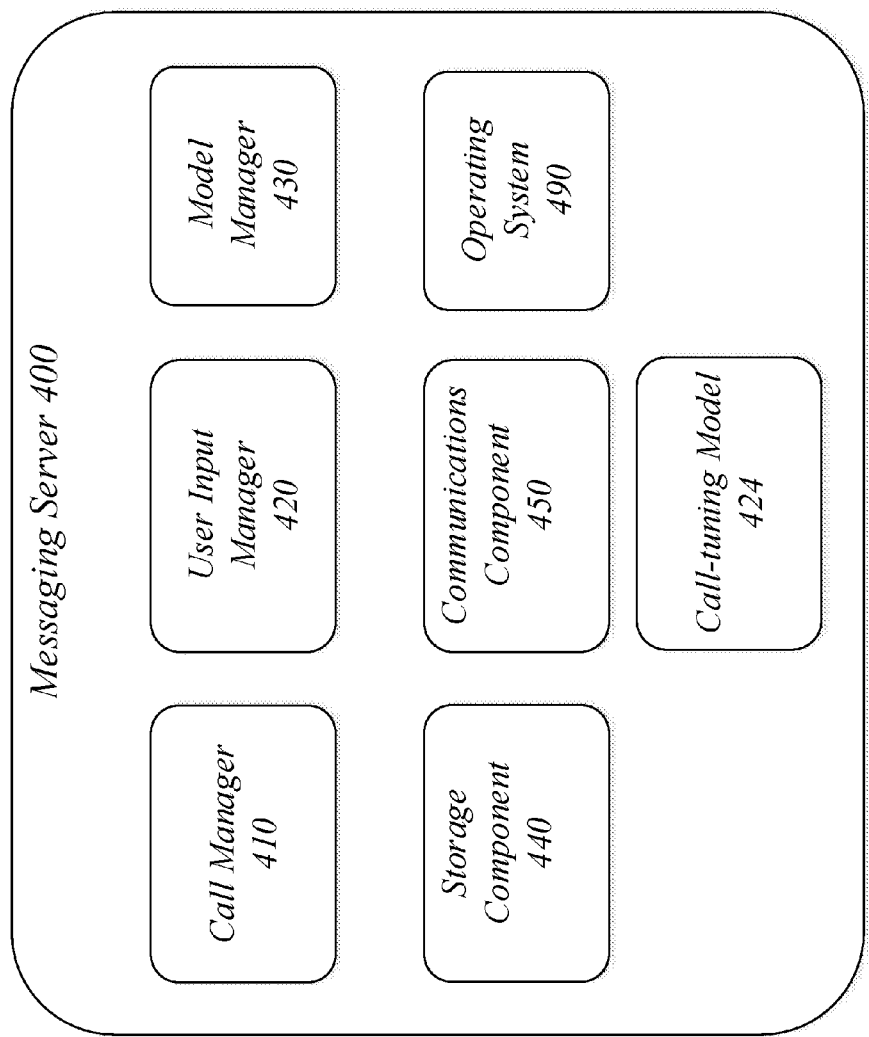
FIG. 4 illustrates an embodiment of a messaging server for the system of FIG. 1.

FIG. 4 illustrates a block diagram of a messaging server 400 for the system 100. The messaging server 400 may be an embodiment of the messaging server 122. The messaging server 400 may include various functional components, such as a call manager 410, a user input manager 420 and a model manager 430. The functional components may represent physical or logical instructions that, when executed by a processor circuit (not shown), perform various operations as will be described. More, fewer, or other components may be used without departing from the functionality of the embodiments.

The call manager 410 may receive communication data from a first client device directed to a second client device (or multiple other client devices) during a call between the first client device and the second client device(s). The call manager 410 may forward the communication data to the second device. In some embodiments, the call manager 410 may decrypt, decompress, or otherwise process the communication data before forwarding or sending the communication data to the second client device(s). The communication data may comprise one or more of: video data, audio data, file data, or text data.

The user input manager 420 may receive, from any of the client devices on the call, user input data. The user input data may comprise one or more of: an audio sticker, a mask, a reaction, an emoji, a doodle, or a mood. The user input manager 420 may use the first user input data as an input to a call-tuning model, and may receive an output of the call-tuning model. The user input manager 420 may provide the output of the call-tuning model to the call manager 410. The user input data may also be forwarded to the other client devices on the call, for example, by the call manager 410 or by the user input manager 420.

The call manager 410 may modify a call parameter of the call according to the output of the call-tuning model in response to the user input data. Call parameters may include, for example and without limitation, an audio codec, a video codec, a video resolution, an image resolution, an output bit rate, a jitter buffer size, a sampling frequency, an echo cancellation setting, a noise suppression setting, and a gain control. The call manager 410 may perform, for example and without limitation, any of: selecting a different audio codec; selecting a different video codec; changing an output bit rate of a codec; changing a size of a jitter buffer; changing a sampling frequency of a recording; changing a sampling frequency of a playout; adjusting an echo cancellation setting; adjusting a noise suppression setting; or adjusting a gain control.

In some embodiments, the call manager 410 may determine a timestamp of when the user input data was sent or received, and may determine one or more call parameters in use at the timestamp. The user input data and the call parameters in use may be correlated according to the timestamps and used together by the model manager 430 for training or updating the call-tuning model. The call manager 410 may determine which call parameter from the call parameters in use to modify in response to the user input data.

Generally, when a call parameter is modified during the call, the modification may apply to all of the client devices on the call. In some embodiments, however, the call manager 410 may modify a call parameter for one of the client devices in a first manner, and modify a call parameter for a different client device in a second manner or not modify the call parameter for the other client devices. For example, some of the participating client devices in a call may have a good quality connection to a local Wi-Fi hotspot, while another participating device may be moving through in a weak cellular service area. The client devices with the good quality connection may continue to send and receive communication data according to their signal strength, while the client device in the weak service area may have their call parameters adjusted to lower quality settings, e.g. low video resolution. In another example, one client device may be generating an echo perceived by other devices. The client device producing the echo may have their echo cancellation parameter adjusted while leaving the other client devices unchanged.

The user input manager 420 may be operative to process the user input data to determine one or more components of the user input data. User input data may include many components which are used to present the user input data on a display, but which may not be needed for call-tuning purposes. The components of user input data that may be useful for call-tuning may include at least one of: a timestamp of the user input data, a duration of the user input data, positioning of the user input data relative to the displayed video, or an identifier of the user input data, e.g. an identifier associated with a specific mask, audio sticker, or emoji. The components may be used, for example, as function parameters or as search terms for the call-tuning model. The call-tuning model may output a call parameter to modify and a modification according to the components. For example, an identifier of an item of user input, e.g. a specific audio sticker, may return a modification to a video resolution setting.

The user input manager 420 may be operative to detect a mood from a facial expression, a change in audio volume, or a change in voice tone within the communication data. The user input manager 420, or other components, may process the communication data to determine a facial expression or determine changes in facial expression. The user input manager 420, or other components, may process the communication data to detect a change in the volume, or to determine a tone, e.g. anger, or a change in a tone. The determined facial expressions and/or tones may be mapped to a mood, which may then be used an input to the call-tuning model.

In some embodiments, the user input manager 420 may detect a change to a sound signature of the call. For example, the sound signature may change from a human voice to a stream of music, or from voice to dead air. The user input manager 420 and the call manager 410 may modify a call parameter of the call according to the call-tuning model according to the detected sound signature. For example, the latency of the call may be adjusted according to the type of input.

The model manager 430 may use the user input data as an input to train the call-tuning model using machine learning to produce an updated call-tuning model. The model manager 430 may also use objective inputs to train the call-tuning model using machine leaning. Objective inputs may comprise one or more of: a bit rate; an encoding parameter; a bandwidth; a carrier; or a measurable property of the call. The model manager 430 may train the call-tuning model periodically, after a call has ended, and/or while a call is occurring. The model manager 430 may send an updated call-tuning model to client devices that use the messaging system 120. The call-tuning model may be general for all client devices that use the messaging system 120. In some embodiments, different call-tuning models may be produced, for example, for different cellular service carriers, for different device platforms, for different geographical regions, and so forth.

In some embodiments, user input data that is not already mapped to an output in the call-tuning model may be provided as input to train the model to determine what call parameters to change. The machine learning that uses these inputs may be supervised, unsupervised, or a combination of supervised and unsupervised learning.

The messaging server 400 may include a storage component 440, a communications component 450, and an operating system 490, which may be analogous to the storage component 310, communications component 330, and operating system 340 discussed in FIG. 3. The storage component 440 may additionally store the instructions for the functional components, and the operating system 490. The storage component 440 may further store data used by the functional components, such as, but not limited to, a call-tuning model 424, and so forth.

Figure 5:
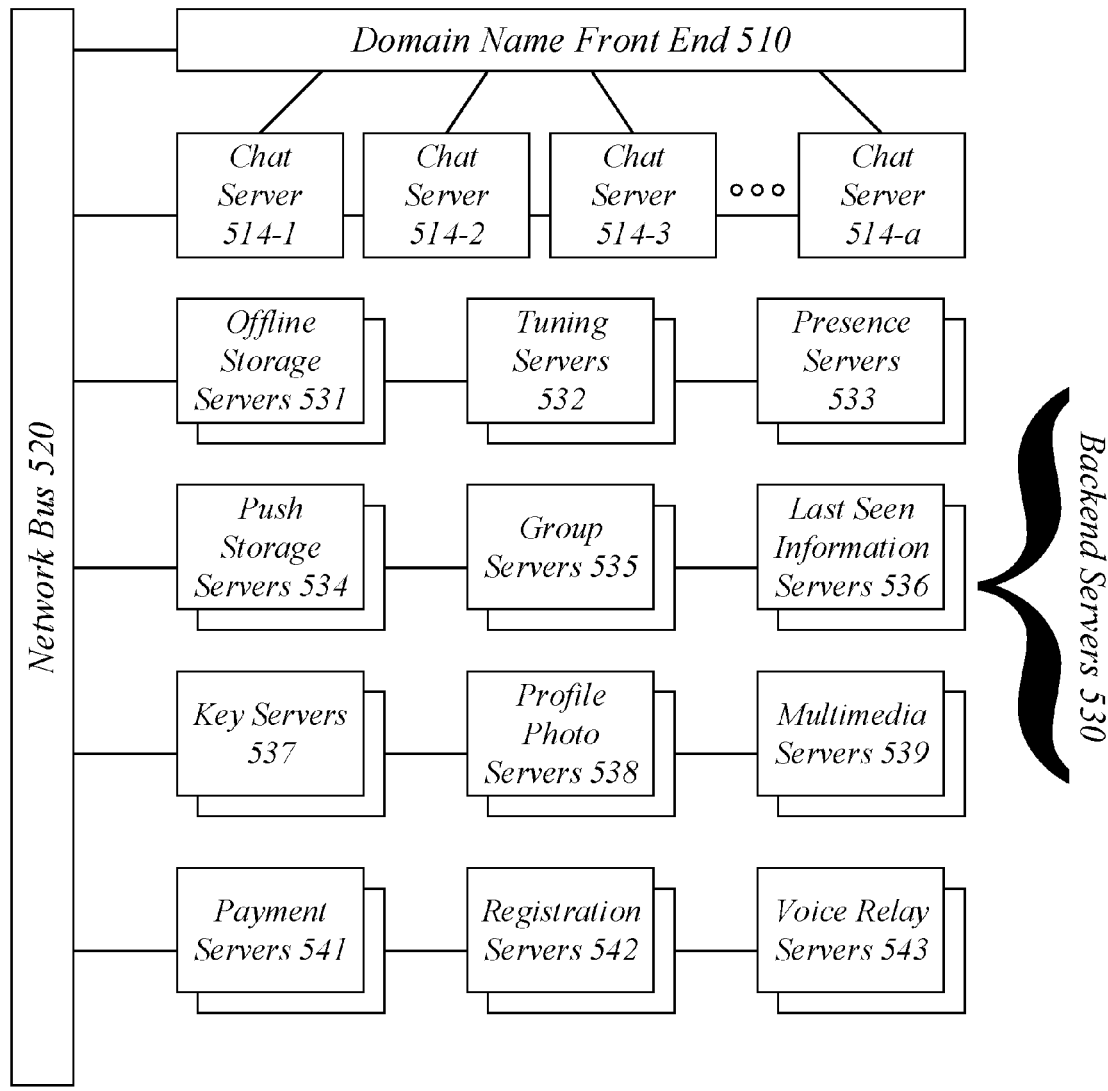
FIG. 5 illustrates an embodiment of a messaging system for the system of FIG. 1.

FIG. 5 illustrates an embodiment of a plurality of servers implementing various functions of a messaging system 500. It will be appreciated that different distributions of work and functions may be used in various embodiments of a messaging system 500. The messaging system 500 may implement some or all of the multiway server system 120.

The messaging system 500 may comprise a domain name front end 510. The domain name front end 510 may be assigned one or more domain names associated with the messaging system 500 in a domain name system (DNS). The domain name front end 510 may receive incoming connections and distribute the connections to servers providing various messaging services.

The messaging system 500 may comprise one or more chat servers 514. The chat servers 514 may comprise front-end servers for receiving and transmitting user-to-user messaging updates such as chat messages or call data 140. Incoming connections may be assigned to the chat servers 514 by the domain name front end 510 based on workload balancing or on the location of a client device 110 initiating a call. The one or more chat servers 514 may be embodiments of one or more multiway servers 122, and may not be publicly accessible.

The messaging system 500 may comprise backend servers 530. The backend servers 530 may perform specialized tasks in the support of the chat operations of the front-end chat servers 514. A plurality of different types of backend servers 530 may be used. It will be appreciated that the assignment of types of tasks to different backend serves 530 may vary in different embodiments. In some embodiments some of the backend services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging system 500 may comprise one or more offline storage servers 531. The one or more offline storage servers 531 may store messaging content for currently-offline messaging endpoints in hold for when the messaging endpoints reconnect.

The messaging system 500 may comprise one or more tuning servers 532. The one or more tuning servers 532 may each receive the user input data 140 and may tune one or more call parameters according to the user input data 140. The tuning servers 532 may also periodically update the call-tuning model according to the user input data 140 and/or objective inputs about the quality of the calls.

The messaging system 500 may comprise one or more presence servers 533. The one or more presence servers 533 may maintain presence information for the messaging system 500. Presence information may correspond to user-specific information indicating whether or not a given user has an online messaging endpoint and is available for chatting, has an online messaging endpoint but is currently away from it, does not have an online messaging endpoint, and any other presence state.

The messaging system 500 may comprise one or more push storage servers 534. The one or more push storage servers 534 may cache push requests and transmit the push requests to messaging endpoints. Push requests may be used to wake messaging endpoints, to notify messaging endpoints that a messaging update is available, and to otherwise perform server-side-driven interactions with messaging endpoints.

The messaging system 500 may comprise one or more group servers 535. The one or more group servers 535 may maintain lists of groups, add users to groups, remove users from groups, and perform the reception, caching, and forwarding of group chat messages.

The messaging system 500 may comprise one or more last seen information servers 536. The one or more last seen information servers 536 may receive, store, and maintain information indicating the last seen location, status, messaging endpoint, and other elements of a user's last seen connection to the messaging system 500.

The messaging system 500 may comprise one or more key servers 537. The one or more key servers 537 may host public keys for public/private key encrypted communication.

The messaging system 500 may comprise one or more profile photo servers 538. The one or more profile photo servers 538 may store and make available for retrieval profile photos for the plurality of users of the messaging system 500.

The messaging system 500 may comprise one or more multimedia servers 539. The one or more multimedia servers 539 may store multimedia (e.g., images, video, audio) in transit between messaging endpoints, and multimedia cached for offline endpoints, and may perform transcoding of multimedia.

The messaging system 500 may comprise one or more payment servers 541. The one or more payment servers 541 may process payments from users. Payments may be received, for example, when a connection to a cellular data network is purchased. The one or more payment servers 541 may connect to external third-party servers for the performance of payments.

The messaging system 500 may comprise one or more registration servers 542. The one or more registration servers 542 may register new users of the messaging system 500.

The messaging system 500 may comprise one or more voice relay servers 543. The one or more voice relay servers 543 may relay voice-over-internet-protocol (VoIP) voice communication in call data 140 between messaging endpoints for the performance of VoIP calls.

The components of messaging system 500 may communicate via a network bus 520. The messaging system 500 may include an authorization server (or other suitable component(s)) that allows users to opt in to or opt out of having their actions logged by the multiway communication system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the multiway communication system 100 and other elements of a social-networking system through blocking, data hashing, anonymization, or other suitable techniques as appropriate.

Figure 6:
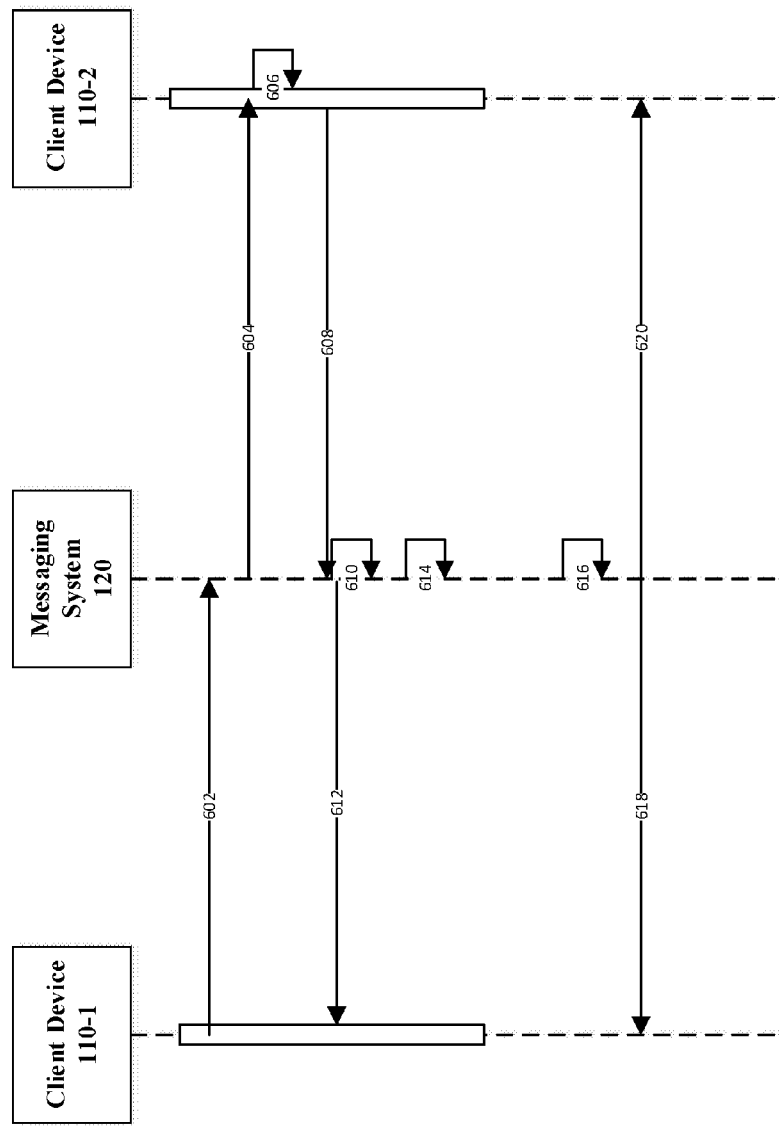
FIG. 6 illustrates an embodiment of a message flow for the system of FIG. 1.
Figure 7:
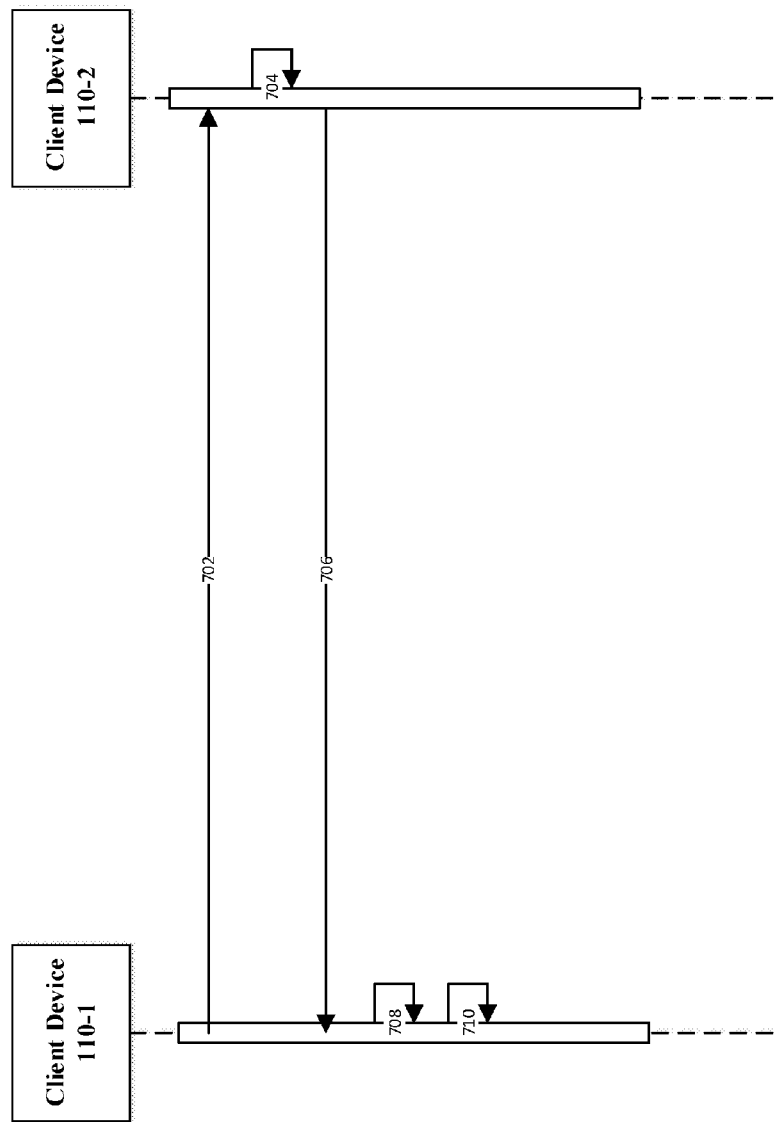
FIG. 7 illustrates an embodiment of a second message flow for the system of FIG. 1.

FIGS. 6-7 illustrate various message flows for the system 100. The message flows may represent messages communicated among the components of system 100. In the illustrated message flows, time flows from the top of the diagram toward the bottom; and a "message" may include data and/or instructions communicated from one component to another, as well as internal functions within a component.

FIG. 6 illustrates a message flow diagram 600 for the system 100. The message flow 600 may represent messages communicated among the components of system 100. In particular, the message flow 600 may occur among two client devices, 110-1 and 110-2, and the messaging system 120. Message flow 600 may represent messages communicated when user input data is received during a call in progress.

The message flow 600 begins when the client device 110-1 sends communication data to the messaging system 120 in the message 602. The communication data may include any data comprising communication from one participant to the other participant(s). The communication data may include, for example, audio data, video data, or any other data representing communication from a participant. The communication data may be in any data format capable of being transmitted over a network in use by the call.

The message flow 600 continues when the messaging system 120 forwards the communication data to the client device 110-2 in the message 604. The messaging system 120 may act as a relay server in passing the communication data from the sending client device to any other devices participating in the call.

The message flow 600 continues when the client device 110-2 receives user input data in the message 606. For example, the operator of the client device 110-2 may use control directives to select or generate user input data such as a mask, an audio sticker, an emoji, and so forth, to send to the other participant(s) in the call. The operator of the client device 110-2 may, for example, experience speech in the received communication data as yelling, and may select a "stop yelling" audio sticker, or a mask that applies an image of a hand over the speaker's mouth. The user input data may be selected or generated within the message application component 320, or by a third-party application capable of interacting with the message application component 320.

The message flow 600 continues when the client device 110-2 sends the user input data to the messaging system 120 in the message 608. For example, the message application component 320 may send the user input data in one or more data packets to the messaging system 120. The user input data may be sent as part of a data packet that also include communication data, or may be sent in separate data packets. The user input data may include a timestamp at which the user input data was generated or sent. The timestamp may be a date and time, retrieved from a clock on the client device 110-2, or may be a timestamp relative to the beginning of the call.

The message flow 600 continues when the messaging system 120 provides the user input data as input to the call-tuning model in the message 610. The messaging system 120 may provide the user input data directly to the call-tuning model, e.g. as a parameter in a function call. The messaging system 120 may process the user input data into components and may provide one or more of the components as inputs to the call-tuning model. In some embodiments, the call-tuning model may be searched, using the user input data or its components as a search query, to retrieve one or more rules that specify which call parameter to change and how to change the call parameter.

The message flow 600 continues when the messaging system 120 forwards the user input data to the client device 110-1 in the message 612. The message 612 may be sent substantially simultaneously with the message 610. In some embodiments, the messaging system 120 may also store the user input data for use as training data.

The message flow 600 continues when the messaging system 120 modifies a call parameter in the message 614. The call-tuning model may provide output according to the user input data provided as input. The messaging system 120 may then modify one or more call parameters according to the output. For example, the output may be a rule that states what call parameter to modify and how to modify the call parameter. In the above example, the gain control may be adjusted to lower the apparent volume from the client device 110-1. The messages 602, 604 606, 608, 610, 612, and 614 may be repeated during the call.

The message flow 600 continues when the messaging system 120 updates the call-tuning model in the message 616. At the time of the message 616, the call may have ended. The messaging system 120 may use some or all of the components of the user input data, alone or in conjunction with objective inputs, to change rules in the call-tuning model, remove rules in the call-tuning model, or create new rules in the call-tuning model.

The message flow 600 continues when the messaging system 120 sends the updated call-tuning model to the client devices 110-1 and 110-2 in the messages 618 and 620, respectively. The messaging system 120 may send the updated call-tuning model to all client devices that use the messaging system 120. The client devices may be operative to tune calls using the call-tuning model, for example, in a peer-to-peer communication session or when the messaging system 120 is not available or used for other reasons.

FIG. 7 illustrates an embodiment of a second message flow for the system of FIG. 1. The message flow 700 may represent messages communicated among the components of system 100. In particular, the message flow 700 may occur among two client devices, 110-1 and 110-2, when user input data is received during a call in progress. More particularly, the message flow 700 may occur when the two devices are in a peer-to-peer call, and/or when the call-tuning model is present on a client device and the call is tuned by the client device(s).

The message flow 700 begins when the client device 110-1 sends communication data to the client device 110-2 in the message 702. The communication data may include any data comprising communication from one participant to the other participant. The communication data may include, for example, audio data, video data, or any other data representing communication from a participant. The communication data may be in any data format capable of being transmitted over a peer-to peer network in use by the call.

The message flow 700 continues when the client device 110-2 receives user input data in the message 704. The message 704 may be analogous to the message 606 from the message flow 600.

The message flow 700 continues when the client device 110-2 sends the user input data to the client device 110-1 in the message 706. The message 706 may be analogous to the message 608 in the message flow 600, but sent to a client device instead of to a messaging system.

The message flow 700 continues when the client device 110-1 provides the user input data as input to the call-tuning model stored on the client device 110-1 in the message 708. The client device 110-1 may provide the user input data directly to the call-tuning model, e.g. as a parameter in a function call. The client device 110-1 may process the user input data into components and may provide one or more of the components as inputs to the call-tuning model. In some embodiments, the call-tuning model may be searched, using the user input data or its components as a search query, to retrieve one or more rules that specify which call parameter to change and how to change the call parameter.

Alternatively, the client device 110-2 may provide the user input data as input to the call-tuning model stored on the client device 110-2.

The message flow 700 continues when the client device 110-1 modifies a call parameter in the message 710. The call-tuning model may provide output according to the user input data provided as input. The client device 110-1, or 110-2, may then modify one or more call parameters according to the output. For example, the output may be a rule that states what call parameter to modify and how to modify the call parameter. In some embodiments, the two client devices may negotiate, over their peer to peer connection, which call parameters to modify and how, according to the output from the call-tuning model.

Figure 8:
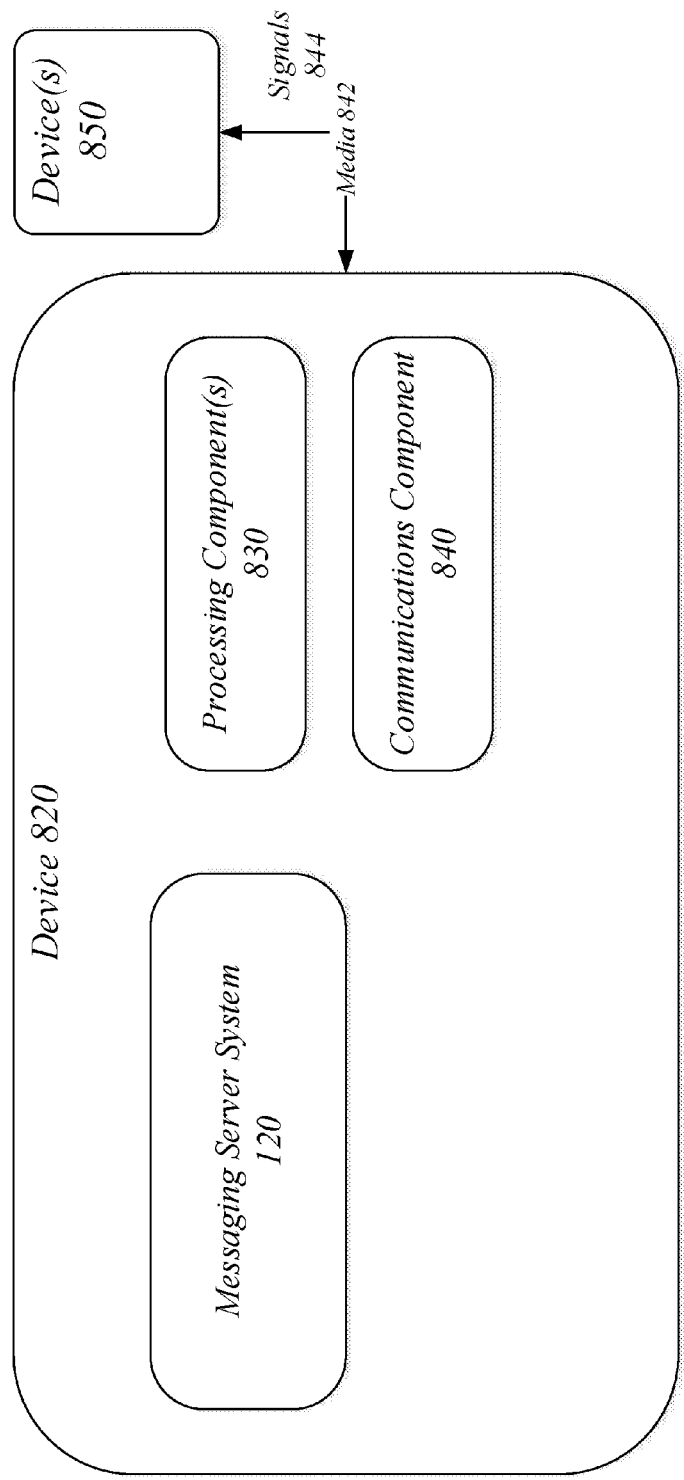
FIG. 8 illustrates a diagram of a centralized system for the system of FIG. 1.

FIG. 8 illustrates a centralized system 800. The centralized system 800 may implement some or all of the structure and/or operations for the system 100 for conducting communications and tuning a call with user input data in a single computing entity, such as entirely within a single device 820.

The device 820 may comprise any electronic device capable of receiving, processing, and sending information, and may be an embodiment of a computing device, e.g. a server 820. Examples of an electronic device may include without limitation an ultra-client device, a client device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 820 may execute processing operations or logic for the system 100 using a processing component 830. The processing component 830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 820 may execute communications operations or logic for the system 100 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 842 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 820 may communicate with other devices 850 over a communications media 842 using communications signals 844 via the communications component 840. The devices 850 may be internal or external to the device 820 as desired for a given implementation.

The device 820 may include within it the messaging server system 120. Device 820 may be operative to carry out the tasks of these elements using processing component 830 and communications component 840. Devices 850 may comprise any of devices 110 or 400, the signals 844 over media 842 comprising the interactions between the device 820 and its elements and these respective devices.

Figure 9:
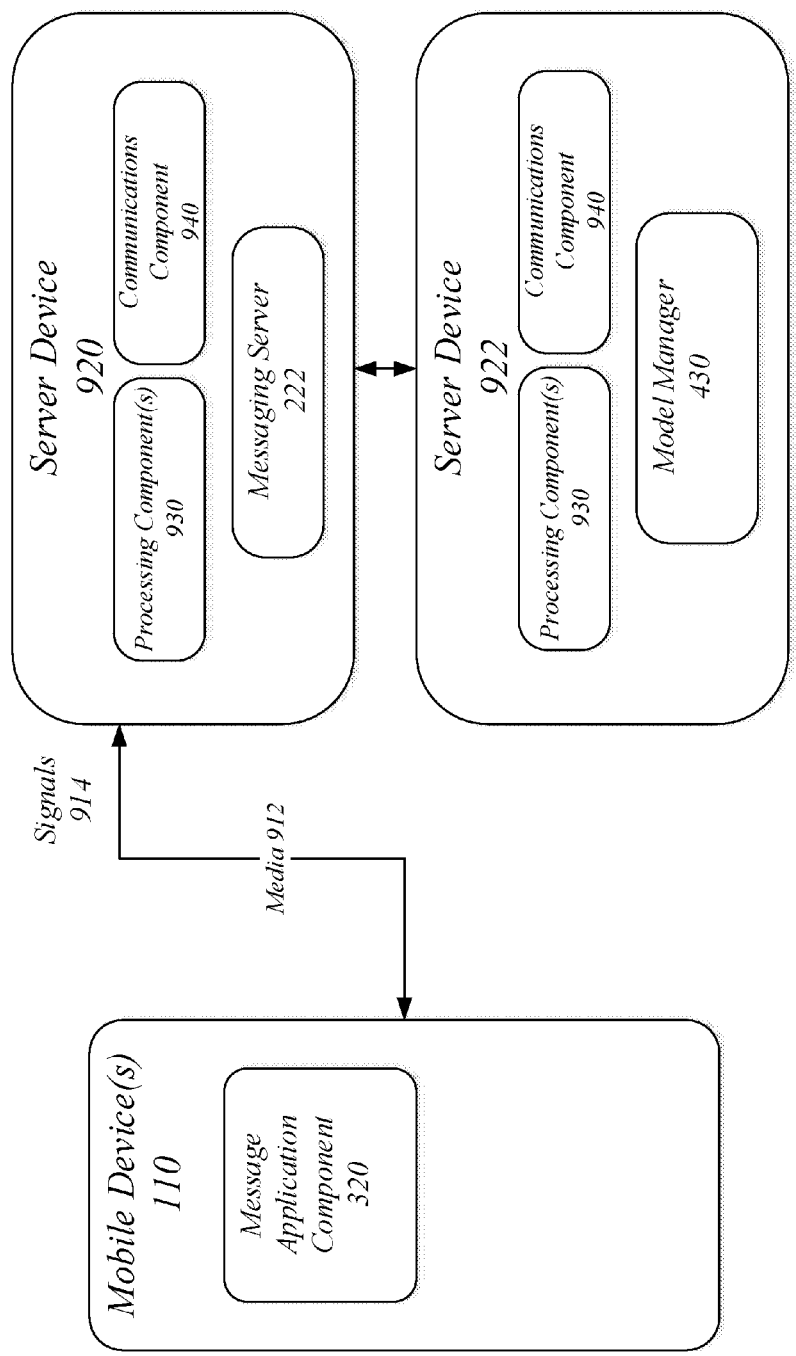
FIG. 9 illustrates a diagram of a distributed system for the system of FIG. 1.

FIG. 9 illustrates an embodiment of a distributed system 900. The distributed system 900 may distribute portions of the structure and/or operations for the system 100 across multiple computing entities. Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 900 may comprise one or more server devices, such as a server device 920 and server device 922. In general, the server devices 920 and 922 may be similar to the device 820 as described with reference to FIG. 8. For instance, the server devices 920 and 922 may comprise a processing component 930 and a communications component 940, which are the same or similar to the processing component 830 and the communications component 840, respectively, as described with reference to FIG. 8. In another example, server devices 920 and 922 may communicate over a communications media 912 using their respective communications signals 914 via the communications components 940.

The server device 920 may comprise or employ one or more server programs that operate to perform various methodologies in accordance with the described embodiments. For example, server device 920 may implement the messaging server 222. The server device 922 may comprise or employ one or more server programs that operate to perform various methodologies in accordance with the described embodiments. For example, server device 922 may implement a model manager 430. It will be appreciated a server device 920 or 922—or any of the server devices discussed herein—may itself comprise multiple servers.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 10:
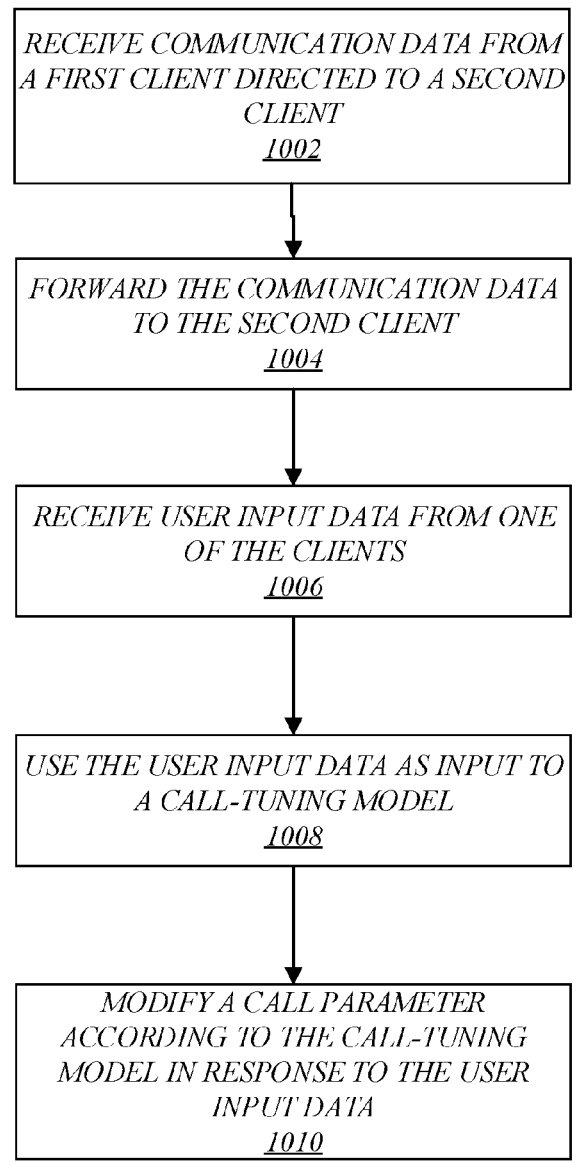
FIG. 10 illustrates an embodiment of a logic flow for the system of FIG. 1.

FIG. 10 illustrates an embodiment of a logic flow 1000 for the system 100. The logic flow 1000 may be representative of some or all of the operations executed by one or more embodiments described herein. The operations of the logic flow 1000 may be performed by the messaging system 120, for example, during a call between two or more participant client devices.

In the illustrated embodiment shown in FIG. 10, the logic flow 1000 may be operative to receive communication data from a first client directed to a second client at block 1002. For example, the call manager 410 in the messaging server 400 may receive communication data from any of the client devices participating in the call. The message server 400 may operate as a relay server during the call.

The logic flow 1000 may be operative to forward the communication data to the second client at block 1004.

The logic flow 1000 may be operative to receive user input data from one of the client devices at block 1006. For example, the user input manager 420 may receive user input data, e.g. an audio sticker, that indicates that the call is breaking up too frequently or that the operator of the device cannot hear the other caller.

The logic flow 1000 may be operative to use the user input data as input to the call-tuning model at block 1008. For example, an identifier of the audio sticker may be used, along with a timestamp when the user input data was generated, may be used to search the call-tuning model for a rule. Other inputs may include, for example, a device type, a carrier, a country, or a location.

The logic flow 1000 may be operative to modify a call parameter according to output from the call-tuning model in response to the user input data at block 1010. For example, the call manager 410 may increase the size of the jitter buffer.

Figure 11:
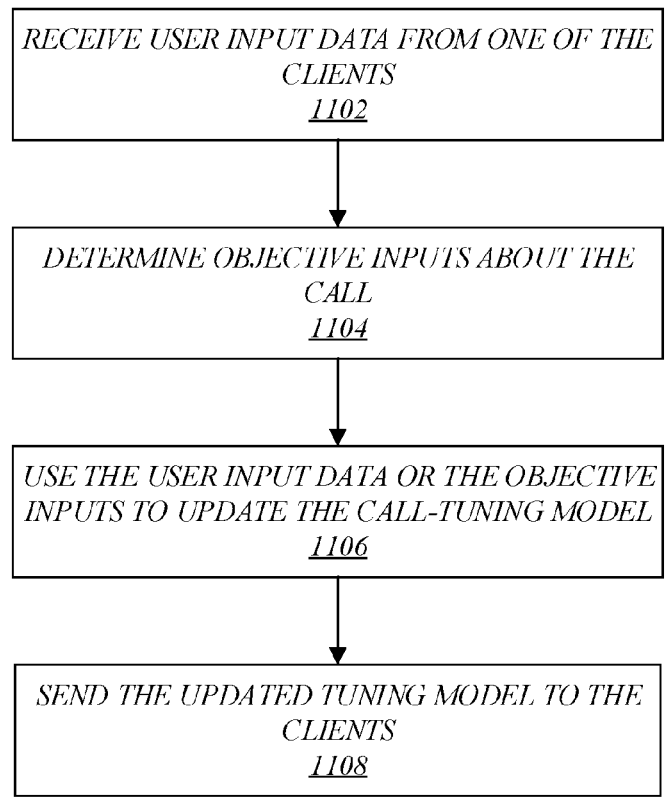
FIG. 11 illustrates an embodiment of a second logic flow for the system of FIG. 1.

FIG. 11 illustrates an embodiment of a logic flow 1100 for the system 100. The logic flow 1100 may be representative of some or all of the operations executed by one or more embodiments described herein. The operations of the logic flow 1100 may be performed by the messaging system 120 during or after a call.

In the illustrated embodiment shown in FIG. 11, the logic flow 1100 may be operative to receive user input data from one of the client devices that participated in a call at block 1102. The user input data from earlier calls may be retrieved from a data store, or may be received during a call in progress.

The logic flow 1100 may be operative to determine objective inputs about the call at block 1104. For example, settings of call parameters in use at the timestamps that correspond to the received user input data are determined. For example, for a user input data sent at timestamp A, the size of the jitter buffer at timestamp A may be determined.

The logic flow 1100 may be operative to use the objective inputs and/or the user input data to update the call-tuning model at block 1106. The model manager 430 may use the user input data, objective inputs, and changes made to the call parameters to determine if a rule needs to be modified, deleted or added. For example, suppose the existing call-tuning model causes a change to the jitter buffer size when a certain user input data is received when the jitter buffer is at one size. If the jitter buffer size is adjusted, but the same user input data continues to be received after the adjustment, it may be that the change did not address the problem, and the rule needs to be modified or deleted.

The logic flow 1100 may be operative to send the updated call-tuning model to the clients at block 1108. The updated call-tuning model may be pushed to all clients that use the messaging system 120, or may be provided when a client connects to the messaging system 120 or requests an updated call-tuning model.

Figure 12:
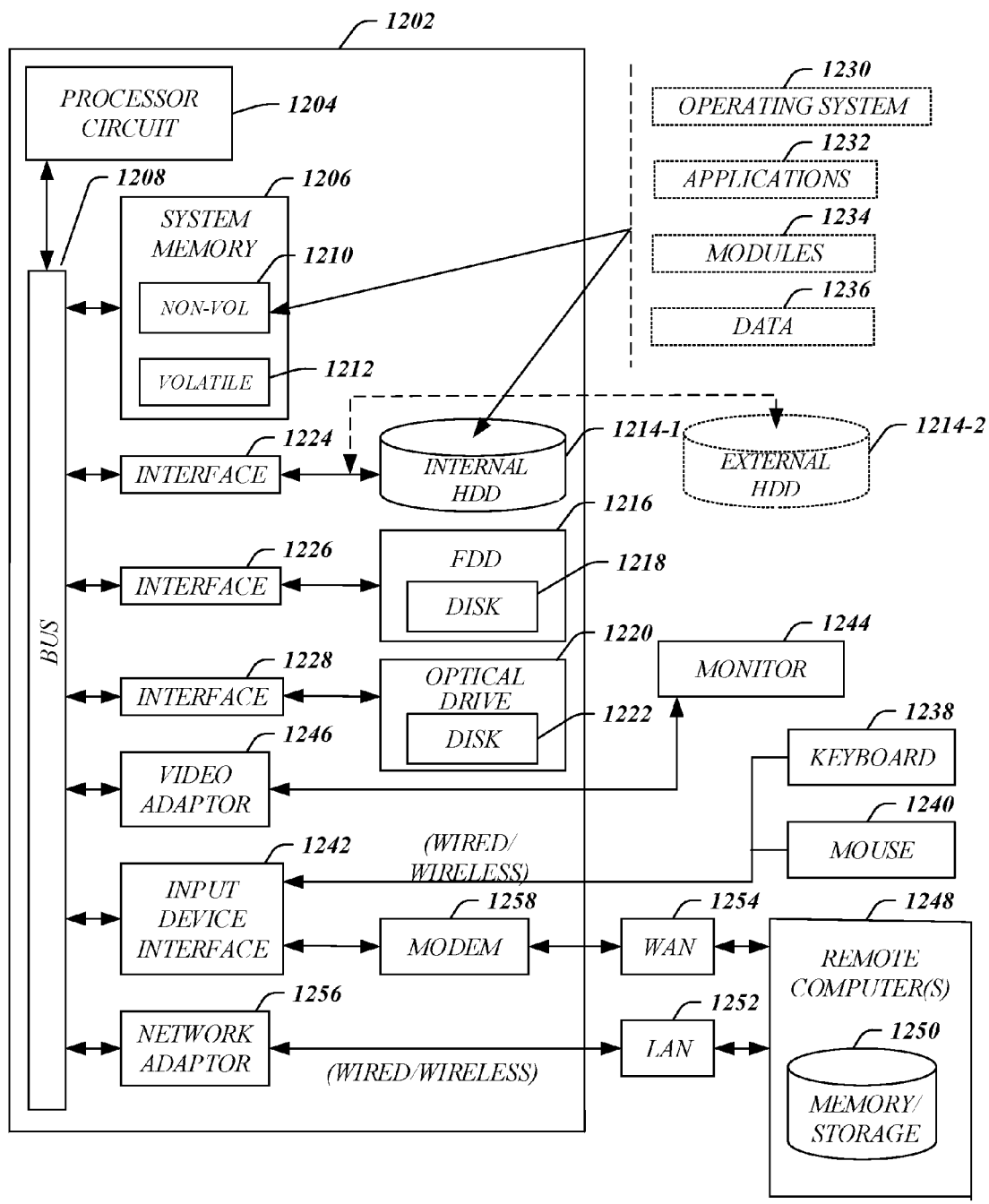
FIG. 12 illustrates an embodiment of a computing architecture.

FIG. 12 illustrates an embodiment of an exemplary computing architecture 1200 suitable for implementing various embodiments as previously described. In one embodiment, the computing architecture 1200 may comprise or be implemented as part of an electronic device. Examples of an electronic device may include those described with reference to FIGS. 8-9, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1200 includes various common computing elements, such as one or more processors, multi-core processors, co-processors, memory units, chip-sets, controllers, peripherals, interfaces, oscillators, timing devices, video cards, audio cards, multimedia input/output (I/O) components, power supplies, and so forth. The embodiments, however, are not limited to implementation by the computing architecture 1200.

As shown in FIG. 12, the computing architecture 1200 comprises a processing circuit 1204, a system memory 1206 and a system bus 1208. The processing circuit 1204 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing circuit 1204.

The system bus 1208 provides an interface for system components including, but not limited to, the system memory 1206 to the processing circuit 1204. The system bus 1208 can be any of several types of bus structure that may further interconnect to a memory bus (with or without a memory controller), a peripheral bus, and a local bus using any of a variety of commercially available bus architectures. Interface adapters may connect to the system bus 1208 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1200 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1206 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 12, the system memory 1206 can include non-volatile memory 1210 and/or volatile memory 1212. A basic input/output system (BIOS) can be stored in the non-volatile memory 1210.

The computer 1202 may include various types of computer-readable storage media in the form of one or more lower speed memory units, including an internal (or external) hard disk drive (HDD) 1214-1 and 1214-2, respectively, a magnetic floppy disk drive (FDD) 1216 to read from or write to a removable magnetic disk 1218, and an optical disk drive 1220 to read from or write to a removable optical disk 1222 (e.g., a CD-ROM or DVD). The HDD 1214, FDD 1216 and optical disk drive 1220 can be connected to the system bus 1208 by a HDD interface 1224, an FDD interface 1226 and an optical drive interface 1228, respectively. The HDD interface 1224 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1210, 1212, including an operating system 1230, one or more application programs 1232, other program modules 1234, and program data 1236. In one embodiment, the one or more application programs 1232, other program modules 1234, and program data 1236 can include, for example, the various applications and/or components of the message application component 520; and the multiway server 600.

An operator can enter commands and information into the computer 1202 through one or more wire/wireless input devices, for example, a keyboard 1238 and a pointing device, such as a mouse 1240. Other input devices may include microphones, infra-red (IR) remote controls, radio-frequency (RF) remote controls, game pads, stylus pens, card readers, dongles, fingerprint readers, gloves, graphics tablets, joysticks, keyboards, retina readers, touch screens (e.g., capacitive, resistive, etc.), trackballs, trackpads, sensors, styluses, and the like. These and other input devices are often connected to the processing circuit 1204 through an input device interface 1242 that is coupled to the system bus 1208, but can be connected by other interfaces such as a parallel port, IEEE 1394 serial port, a game port, a USB port, an IR interface, and so forth.

A monitor 1244 or other type of display device is also connected to the system bus 1208 via an interface, such as a video adaptor 1246. The monitor 1244 may be internal or external to the computer 1202. In addition to the monitor 1244, a computer typically includes other peripheral output devices, such as speakers, printers, and so forth.

The computer 1202 may operate in a networked environment using logical connections via wired and/or wireless communications to one or more remote computers, such as a remote computer 1248. The remote computer 1248 can be a workstation, a server computer, a router, a personal computer, a portable computer, a microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, for example, a wide area network (WAN) 1254. Such LAN and WAN networking environments are commonplace in offices and companies, and facilitate enterprise-wide computer networks, such as intranets, all of which may connect to a global communications network, for example, the Internet.

When used in a LAN networking environment, the computer 1202 is connected to the LAN 1252 through a wired and/or wireless communication network interface or adaptor 1256. The adaptor 1256 can facilitate wired and/or wireless communications to the LAN 1252, which may also include a wireless access point disposed thereon for communicating with the wireless functionality of the adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired and/or wireless device, connects to the system bus 1208 via the input device interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with wire and wireless devices or entities using the IEEE 802 family of standards, such as wireless devices operatively disposed in wireless communication (e.g., IEEE 802.21 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.21x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 13:
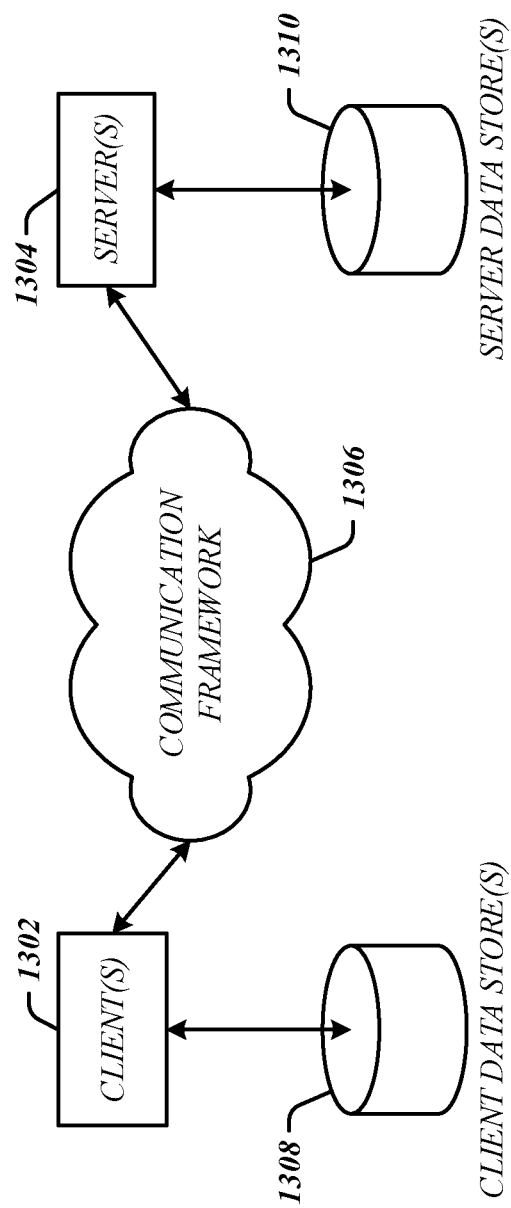
FIG. 13 illustrates an embodiment of a communications architecture.

FIG. 13 illustrates a block diagram of an exemplary architecture 1300 suitable for implementing various embodiments as previously described. The communications architecture 1300 includes various common communications elements, such as a transmitter, receiver, transceiver, radio, network interface, baseband processor, antenna, amplifiers, filters, power supplies, and so forth. The embodiments, however, are not limited to this implementation by the communications architecture 1300.

As shown in FIG. 13, the communications architecture 1300 comprises one or more clients 1302 and servers 1304. The clients 1302 may implement the devices 1220. The servers 1304 may implement the server devices 1320, 1322. The clients 1302 and the servers 1304 are operatively connected to one or more respective client data stores 1308 and server data stores 1310 that can be employed to store information local to the respective clients 1302 and servers 1304, such as cookies and/or associated contextual information.

The clients 1302 and the servers 1304 may communicate information among each other using a communication framework 1306. The communications framework 1306 may implement any well-known communications techniques and protocols. The communications framework 1306 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1306 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1302 and the servers 1304. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 14:
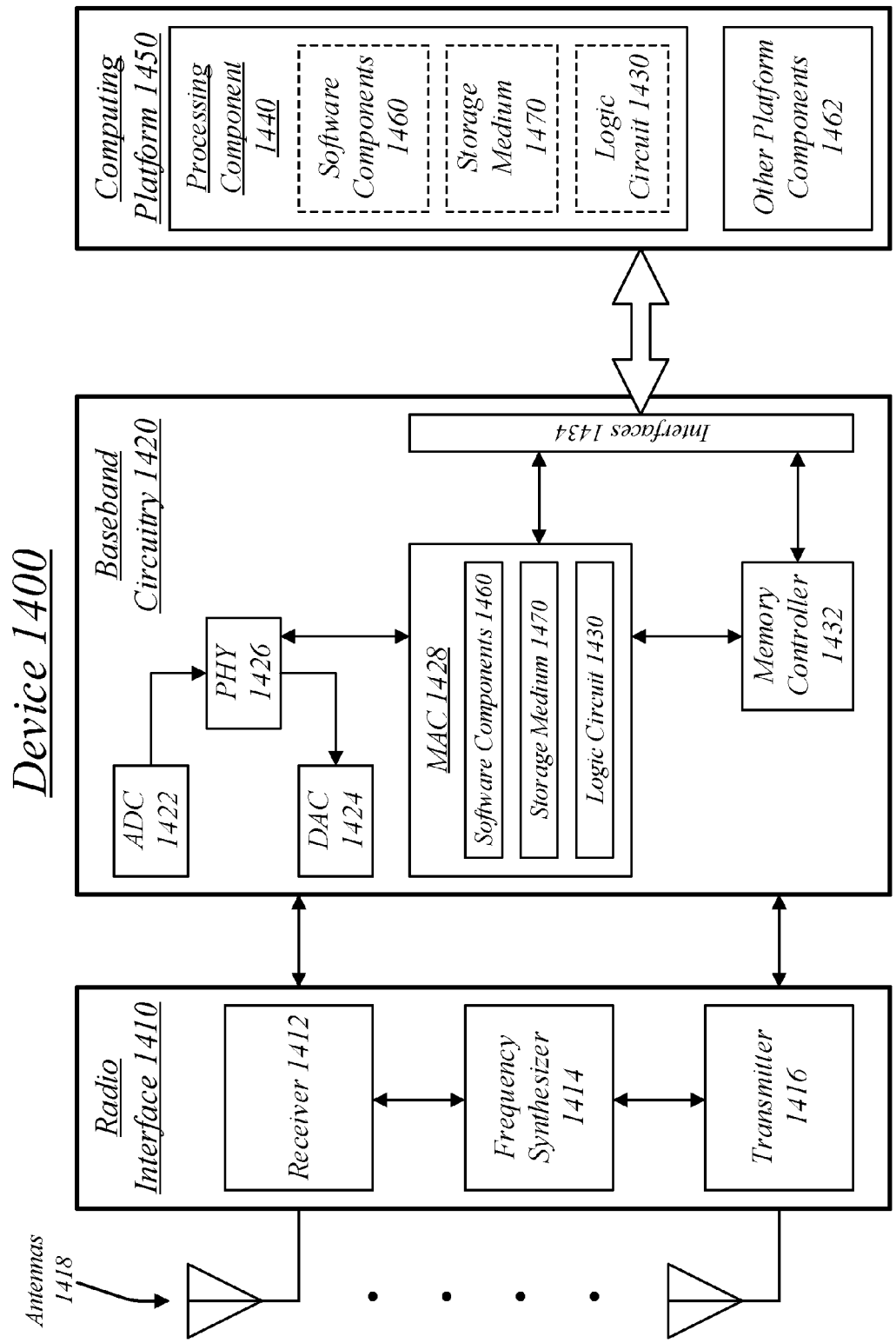
FIG. 14 illustrates an embodiment of a device for use in a multicarrier OFDM system.

FIG. 14 illustrates an embodiment of a device 1400 for use in a multicarrier OFDM system, such as the multiway communication system 100. Device 1400 may implement, for example, software components 1460 as described with reference to client device 110, 500 and/or a logic circuit 1430. The logic circuit 1430 may include physical circuits to perform operations described for the client device 110, 500. As shown in FIG. 14, device 1400 may include a radio interface 1410, baseband circuitry 1420, and computing platform 1450, although embodiments are not limited to this configuration.

The device 1400 may implement some or all of the structure and/or operations for the client device 110, 500 and/or logic circuit 1430 in a single computing entity, such as entirely within a single device. Alternatively, the device 1400 may distribute portions of the structure and/or operations for the client device 110, 500 and/or logic circuit 1430 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1410 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1410 may include, for example, a receiver 1412, a transmitter 1416 and/or a frequency synthesizer 1414. Radio interface 1410 may include bias controls, a crystal oscillator and/or one or more antennas 1418. In another embodiment, radio interface 1410 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1420 may communicate with radio interface 1410 to process, receive and/or transmit signals and may include, for example, an analog-to-digital converter 1422 for down converting received signals, a digital-to-analog converter 1424 for up converting signals for transmission. Further, baseband circuitry 1420 may include a baseband or physical layer (PHY) processing circuit 1426 for PHY link layer processing of respective receive/transmit signals. Baseband circuitry 1420 may include, for example, a processing circuit 1428 for medium access control (MAC)/data link layer processing. Baseband circuitry 1420 may include a memory controller 1432 for communicating with processing circuit 1428 and/or a computing platform 1450, for example, via one or more interfaces 1434.

In some embodiments, PHY processing circuit 1426 may include a frame construction and/or detection module, in combination with additional circuitry such as a buffer memory, to construct and/or deconstruct communication frames, such as radio frames. Alternatively or in addition, MAC processing circuit 1428 may share processing for certain of these functions or perform these processes independent of PHY processing circuit 1426. In some embodiments, MAC and PHY processing may be integrated into a single circuit.

The computing platform 1450 may provide computing functionality for the device 1400. As shown, the computing platform 1450 may include a processing component 1440. In addition to, or alternatively, the baseband circuitry 1420, the device 1400 may execute processing operations or logic for the client device 110, 500 and logic circuit 1430 using the processing component 1440. The processing component 1440 (and/or PHY 1426 and/or MAC 1428) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1450 may further include other platform components 1462. Other platform components 1462 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth.

The computing platform 1450 and the baseband circuitry 1420 may further include one or memory units in the form of storage medium 1470. Examples of memory units may include, without limitation. various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1400 may be, for example, an ultra-client device, a client device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1400 described herein, may be included or omitted in various embodiments of device 1400, as suitably desired. In some embodiments, device 1400 may be configured to be compatible with protocols and frequencies associated one or more of the 3GPP LTE Specifications and/or IEEE 802.16 standards for WMANs, and/or other broadband wireless networks, cited herein, although the embodiments are not limited in this respect.

Embodiments of device 1400 may be implemented using single input single output (SISO) architectures. However, certain implementations may include multiple antennas (e.g., antennas 1418) for transmission and/or reception using adaptive antenna techniques for beamforming or spatial division multiple access (SDMA) and/or using MIMO communication techniques.

The components and features of device 1400 may be implemented using any combination of discrete circuitry, application specific integrated circuits (ASICs), logic gates and/or single chip architectures. Further, the features of device 1400 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1400 shown in the block diagram of FIG. 14 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Accordingly, embodiments include methods, apparatuses, and computer-readable storage media for communicating using audio messages. For example, a method may include receiving communication data from a first client device, at a server, directed to a second client device during a call between the first client device and the second client device; forwarding the communication data to the second device; receiving from one of the first client device or the second client device, first user input data; using the first user input data as an input to a call-tuning model; and modifying a call parameter of the call according to output from the call-tuning model in response to the first user input. the communication data may comprise one or more of: video data, audio data, file data, or text data. The user input data may comprise one or more of: an audio sticker, a mask, a reaction, an emoji, a doodle, or a mood.

The method may further include using the first user input data as an input to train the call-tuning model using machine learning. The method may further include using objective inputs to train the call-tuning model using machine leaning. The objective inputs comprise one or more of: a bit rate; an encoding parameter; a bandwidth; a carrier; or a measurable property of the call.

The method may further include sending an updated call-tuning model to the first and second client devices.

The method may further include determining a timestamp of the first user input data; determining one or more call parameters at the timestamp; and determining which call parameter to modify in response to the first user input data. The method may further include detecting a mood from a facial expression, a change in audio volume, or a change in voice tone.

The method may further include processing the first user input data to determine one or more components of the user input, the components comprising at least one of: a timestamp of the first user input data, a duration of the first user input data, or an identifier of the first user input data; wherein the call-tuning model modifies a call parameter according to the components.

The method may further include using an identifier of a user input to determine a call parameter change.

The method may further include modifying a call parameter for one of the first client or the second client in a first manner, and modifying a call parameter for the other of the first client or the second client in a second manner.

The method may further include modifying a call parameter by: selecting a different audio codec; selecting a different video codec; changing an output bit rate of a codec; changing a size of a jitter buffer; changing a sampling frequency of a recording; changing a sampling frequency of a playout; adjusting an echo cancellation setting; adjusting a noise suppression setting; or adjusting a gain control.

The method may further include detecting a change to a sound signature of the call; and modifying a call parameter of the call according to the call-tuning model according to the detected sound signature.

An apparatus may include a processor circuit; a call manager component for execution on the processor circuit to receive communication data from a first client device directed to a second client device during a call between the first client device and the second client device, and forward the communication data to the second device; and a user input manager component to receive, from one of the first client device or the second client device, first user input data, use the first user input data as an input to a call-tuning model, and receive an output of the call-tuning model; the call manager component to modify a call parameter of the call according to the output of the call-tuning model in response to the first user input.

The apparatus may further include a model manager component for execution on the processor circuit to use the first user input data as an input to train the call-tuning model using machine learning.

The model manager component may use objective inputs to train the call-tuning model using machine leaning.

The model manager component may send an updated call-tuning model to the first and second client devices.

The objective inputs may comprise one or more of: a bit rate; an encoding parameter; a bandwidth; a carrier; or a measurable property of the call.

The call manager may determine a timestamp of the first user input data; determine one or more call parameters at the timestamp; and determine which call parameter to modify in response to the first user input data.

The communication data may comprise one or more of: video data, audio data, file data, or text data.

The user input data may comprise one or more of: an audio sticker, a mask, a reaction, an emoji, a doodle, or a mood.

The user input manager component may detect a mood from a facial expression, a change in audio volume, or a change in voice tone.

The user input manager component may process the first user input data to determine one or more components of the user input data, the components comprising at least one of: a timestamp of the first user input data, a duration of the first user input data, or an identifier of the first user input data; wherein the call-tuning model outputs a call parameter to modify and a modification according to the components.

The user input manager to use an identifier of a user input to determine a call parameter change.

The call manager component may modify a call parameter for one of the first client or the second client in a first manner, and modify a call parameter for the other of the first client or the second client in a second manner.

The call manager component may modify a call parameter by: selecting a different audio codec; selecting a different video codec; changing an output bit rate of a codec; changing a size of a jitter buffer; changing a sampling frequency of a recording; changing a sampling frequency of a playout; adjusting an echo cancellation setting; adjusting a noise suppression setting; or adjusting a gain control.

The user input manager component may detect a change to a sound signature of the call; and modify a call parameter of the call according to the call-tuning model according to the detected sound signature.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
   receiving communication data from a first client device, at a server, directed to a second client device during a call between the first client device and the second client device;
   forwarding the communication data to the second device;
   receiving from one of the first client device or the second client device, first user input data;
   using the first user input data as an input to a call-tuning model; and
   modifying a call parameter of the call according to output from the call-tuning model in response to the first user input.

2. The method of claim 1, comprising:
   using the first user input data as an input to train the call-tuning model using machine learning.

3. The method of claim 2, comprising:
using objective inputs to train the call-tuning model using machine learning.

4. The method of claim 3, comprising:
sending an updated call-tuning model to the first and second client devices.

5. The method of claim 1, comprising:
determining a timestamp of the first user input data;
determining one or more call parameters at the timestamp; and
determining which call parameter to modify in response to the first user input data.

6. The method of claim 1, comprising:
processing the first user input data to determine one or more components of the user input data, the components comprising at least one of: a timestamp of the first user input data, a duration of the first user input data, or an identifier of the first user input data; wherein the call-tuning model modifies a call parameter according to the components.

7. The method of claim 1, wherein modifying a call parameter comprises:
selecting a different audio codec;
selecting a different video codec;
changing an output bit rate of a codec;
changing a size of a jitter buffer;
changing a sampling frequency of a recording;
changing a sampling frequency of a playout;
adjusting an echo cancellation setting;
adjusting a noise suppression setting; or
adjusting a gain control.

8. An apparatus, comprising:
a processor circuit;
a call manager component for execution on the processor circuit to receive communication data from a first client device directed to a second client device during a call between the first client device and the second client device, and forward the communication data to the second device; and
a user input manager component to receive, from one of the first client device or the second client device, first user input data, use the first user input data as an input to a call-tuning model, and receive an output of the call-tuning model;
the call manager component to modify a call parameter of the call according to the output of the call-tuning model in response to the first user input.

9. The apparatus of claim 8, further comprising a model manager component for execution on the processor circuit to use the first user input data as an input to train the call-tuning model using machine learning.

10. The apparatus of claim 9, the model manager component further to use objective inputs to train the call-tuning model using machine learning and to send an updated call-tuning model to the first and second client devices.

11. The apparatus of claim 10, wherein the objective inputs comprise one or more of: a bit rate; an encoding parameter; a bandwidth; a carrier; or a measurable property of the call.

12. The apparatus of claim 8, the user input manager component further to process the first user input data to determine one or more components of the user input data, the components comprising at least one of: a timestamp of the first user input data, a duration of the first user input data, or an identifier of the first user input data; wherein the call-tuning model outputs a call parameter to modify and a modification according to the components.

13. The apparatus of claim 8, the call manager component further to modify a call parameter for one of the first client or the second client in a first manner, and modify a call parameter for the other of the first client or the second client in a second manner.

14. The apparatus of claim 8, the user input manager component further to detect a change to a sound signature of the call; and modify a call parameter of the call according to the call-tuning model according to the detected sound signature.

15. At least one computer-readable storage medium comprising instructions for a component that, when executed, cause a messaging server to:
receive communication data from a first client device, at a server, directed to a second client device during a call between the first client device and the second client device;
forward the communication data to the second device;
receive from one of the first client device or the second client device, first user input data;
use the first user input data as an input to a call-tuning model; and
modify a call parameter of the call according to output from the call-tuning model in response to the first user input.

16. The computer-readable storage medium of claim 15, comprising instructions that when executed, cause the server to use the first user input data as an input to train the call-tuning model using machine learning.

17. The computer-readable storage medium of claim 15, the communication data comprising one or more of: video data, audio data, file data, or text data.

18. The computer-readable storage medium of claim 15, the user input data comprising one or more of: an audio sticker, a mask, a reaction, an emoji, a doodle, or a mood.

19. The computer-readable storage medium of claim 18, comprising instructions that when executed, cause the server to:
detect a mood from a facial expression, a change in audio volume, or a change in voice tone.

20. The computer-readable storage medium of claim 15, comprising instructions that when executed, cause the server to modify a call parameter by:
selecting a different audio codec;
selecting a different video codec;
changing an output bit rate of a codec;
changing a size of a jitter buffer;
changing a sampling frequency of a recording;
changing a sampling frequency of a playout;
adjusting an echo cancellation setting;
adjusting a noise suppression setting; or
adjusting a gain control.

* * * * *